(12) United States Patent
Hamane et al.

(10) Patent No.: US 8,731,791 B2
(45) Date of Patent: May 20, 2014

(54) CONTROLLER OF INTERNAL COMBUSTION ENGINE

(75) Inventors: Shouta Hamane, Chigasaki (JP); Takayuki Iwasaki, Yokohama (JP); Yoshikazu Hirato, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 738 days.

(21) Appl. No.: 12/996,706

(22) PCT Filed: Apr. 30, 2009 (Under 37 CFR 1.47)

(86) PCT No.: PCT/JP2009/058480
§ 371 (c)(1), (2), (4) Date: Feb. 11, 2011

(87) PCT Pub. No.: WO2009/150909
PCT Pub. Date: Dec. 17, 2009

(65) Prior Publication Data
US 2012/0209480 A1    Aug. 16, 2012

(30) Foreign Application Priority Data

Jun. 10, 2008 (JP) .................................. 2008-151183

(51) Int. Cl.
  *B60W 10/02* (2006.01)
  *B60W 10/10* (2012.01)
  *B60W 10/06* (2006.01)

(52) U.S. Cl.
  USPC ............... 701/54; 701/66; 701/67; 701/68; 123/179.1; 123/179.3; 123/179.4; 123/179.5; 123/339.24; 123/339.1; 123/339.11; 123/339.14; 74/6; 74/7 R; 74/7 C

(58) Field of Classification Search
  USPC ........... 701/54, 66, 67, 68; 123/179.1, 179.4, 123/179.3, 179.5, 339.24, 339.1, 339.11, 123/339.14; 74/6, 7 R, 7 C
  See application file for complete search history.

(56) References Cited

U.S. PATENT DOCUMENTS 4,095,576 A * 6/1978 Hattori et al. ............ 123/406.66
4,231,091 A * 10/1980 Motz ........................... 701/102
(Continued)

FOREIGN PATENT DOCUMENTS

CN 2210413 Y 10/1995
CN 1412034 A 4/2003
(Continued)

*Primary Examiner* — Thomas Black
*Assistant Examiner* — Sara Nelson
(74) *Attorney, Agent, or Firm* — Foley & Lardner LLP

(57) ABSTRACT

When an internal combustion engine is cranked up from a stopped position of a piston in a restart-time first ignition cylinder which is scheduled to start a combustion at the time of an automatic restart of the engine under an automatic stop of the engine during an idling-stop control, a restart-time ignition time interval between a time point when the cranking of the engine is started and a time point when the restart-time first ignition cylinder is initially ignited is calculated. A drive-start timing of a starter motor is delayed according to this restart-time ignition time interval. Thereby, the cranking of the engine is carried out by the starter motor under a state where the hydraulic pressure supplied from the electric oil pump has increased. Thus, the slip in the clutch of the CVT can be suppressed when the gas mixture in the restart-time first ignition cylinder is initially ignited.

8 Claims, 6 Drawing Sheets

(56) References Cited

U.S. PATENT DOCUMENTS

| | | | |
|---|---|---|---|
| 4,364,343 A * | 12/1982 | Malik | 123/179.4 |
| 5,213,080 A * | 5/1993 | Lambert et al. | 123/406.65 |
| 5,438,968 A * | 8/1995 | Johnson et al. | 123/446 |
| 6,275,759 B1 * | 8/2001 | Nakajima et al. | 701/54 |
| 6,408,825 B1 * | 6/2002 | Enoki et al. | 123/467 |
| 6,776,739 B2 | 8/2004 | Eguchi et al. | |
| 6,895,917 B2 * | 5/2005 | Itoh et al. | 123/179.4 |
| 6,926,639 B2 * | 8/2005 | Hopper | 477/110 |
| 7,079,941 B2 * | 7/2006 | Tetsuno et al. | 701/112 |
| 7,237,521 B2 * | 7/2007 | Yuya et al. | 123/179.3 |
| 7,441,541 B2 * | 10/2008 | Nakamura et al. | 123/333 |
| 7,503,308 B2 * | 3/2009 | Kitagawa | 123/325 |
| 7,730,982 B2 | 6/2010 | Hidaka et al. | |
| 7,771,309 B2 * | 8/2010 | Kamada et al. | 477/3 |
| 7,860,636 B2 * | 12/2010 | Yamaguchi | 701/112 |
| 8,132,555 B2 * | 3/2012 | Lewis et al. | 123/305 |
| RE43,588 E * | 8/2012 | Akazaki et al. | 60/278 |
| 8,476,777 B2 * | 7/2013 | Usami et al. | 290/38 R |
| 2002/0017260 A1 * | 2/2002 | Saito et al. | 123/179.3 |
| 2002/0019691 A1 | 2/2002 | Matsubara et al. | |
| 2002/0038646 A1 * | 4/2002 | Nishimura et al. | 123/339.11 |
| 2005/0022770 A1 * | 2/2005 | Yumiyama et al. | 123/179.4 |
| 2007/0227489 A1 * | 10/2007 | Ando | 123/179.3 |
| 2008/0072860 A1 * | 3/2008 | Nakamura et al. | 123/179.4 |
| 2011/0061628 A1 * | 3/2011 | Fujita et al. | 123/406.47 |
| 2011/0232605 A1 * | 9/2011 | Ashizawa | 123/445 |

FOREIGN PATENT DOCUMENTS

| | | |
|---|---|---|
| JP | 2002-115579 A | 4/2002 |
| JP | 2003-120357 A | 4/2003 |
| JP | 2003-343706 A | 12/2003 |
| JP | 2007-015679 A | 1/2007 |

* cited by examiner

1 ··· INTERNAL COMBUSTION ENGINE
9 ··· C/U (CONTROL UNIT)

FIG.2

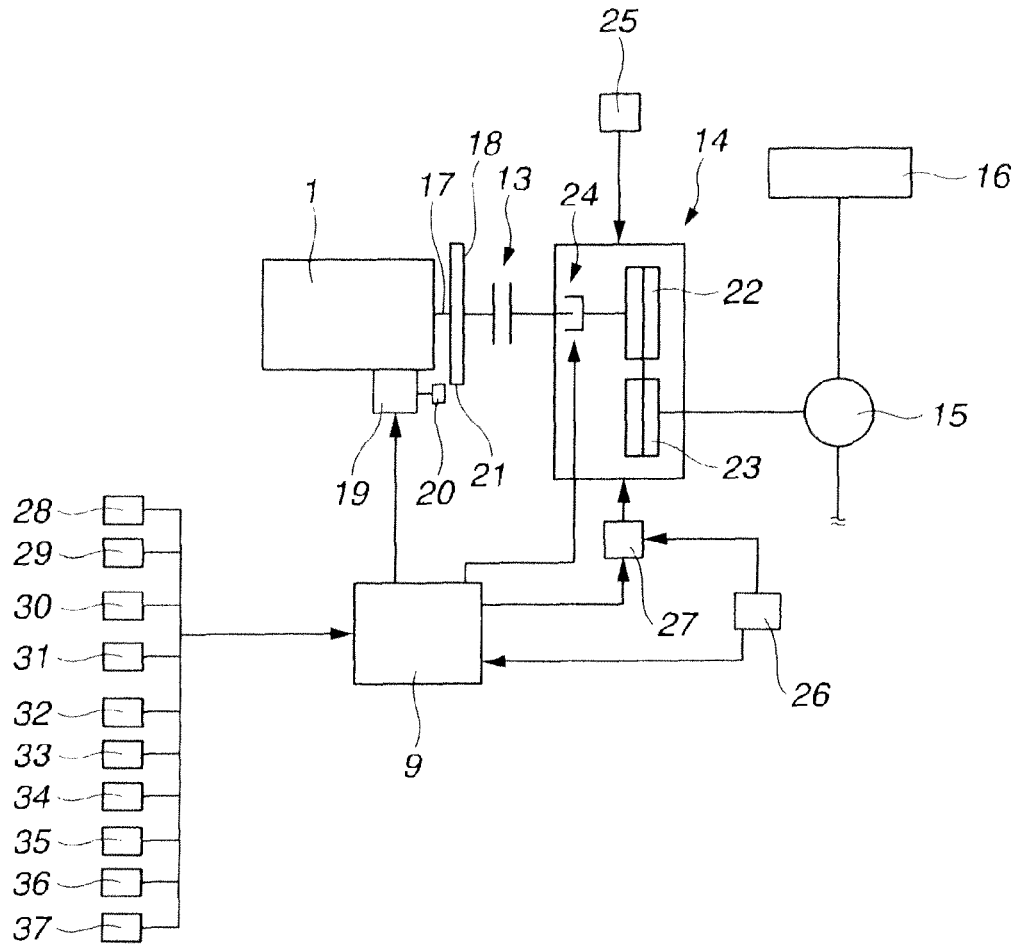

1 ··· INTERNAL COMBUSTION ENGINE
9 ··· C/U (CONTROL UNIT)
13 ··· TORQUE CONVERTER
14 ··· CVT
15 ··· DIFFERENTIAL GEAR
16 ··· DRIVE WHEEL
17 ··· CRANKSHAFT
18 ··· DRIVE PLATE
19 ··· STARTER MOTOR
20 ··· PINION GEAR
21 ··· RING GEAR
22 ··· PRIMARY PULLEY
23 ··· SECONDARY PULLEY
24 ··· CLUTCH

25 ··· MECHANICAL OIL PUMP
26 ··· BATTERY
27 ··· ELECTRIC OIL PUMP
28 ··· CRANK ANGLE SENSOR
29 ··· CAM ANGLE SENSOR
30 ··· OIL TEMPERATURE SENSOR
31 ··· HYDRAULIC-PRESSURE SENSOR
32 ··· WATER-TEMPERATURE SENSOR
33 ··· ACCELERATOR SENSOR
34 ··· VEHICLE SPEED SENSOR
35 ··· SELECTED-POSITION SENSOR
36 ··· OPEN/CLOSED-STATE SENSOR
37 ··· BRAKE-PEDAL SENSOR

CONTROLLER OF INTERNAL COMBUSTION ENGINE

TECHNICAL FIELD

The present invention relates to a controller of internal combustion engine equipped with an automatic transmission and an idling-stop function.

BACKGROUND ART

Patent Document 1 discloses a previously proposed technique. In this technique, a line pressure is supplied to an automatic transmission by driving an electric oil pump, when an internal combustion engine is automatically temporarily stopped at the time of a brief stop of vehicle such as a traffic-light wait, i.e., when a so-called idling-stop is carried out. Thereby, an engaged state of clutch inside the automatic transmission is maintained to transmit a torque outputted from the internal combustion engine, from an input side of the automatic transmission to an output side of the automatic transmission, in order to prevent a slip of the clutch in the automatic transmission at the time of automatic restart of the internal combustion engine. At this time, in a case where an engaging force of the clutch is small, i.e., in a case where hydraulic pressure from the electric oil pump is in short supply due to the mixing of air into working oil or the like, an output torque of the internal combustion engine at the time of automatic restart is suppressed in order to prevent the clutch in the automatic transmission from slipping.

CITATION LIST

Patent Document

Patent Document 1: Japanese Patent Application Publication No. 2002-115579

SUMMARY OF THE INVENTION

Technical Problem

However, when the internal combustion engine is automatically restarted, a sufficient air has been stored in an intake collector and thereby air quantity is not adjusted by a throttle control. Hence, in order to suppress the output torque of internal combustion engine, for example, it is necessary to make an air-fuel ratio very lean or to retard an ignition timing to a large degree. In such cases, a combustion of the internal combustion engine becomes unstable although the slip of clutch in the automatic transmission at the time of automatic restart is suppressed. According to circumstances, there is a risk that an engine misfire is caused.

Solution to Problem

Therefore, a structure according to the present invention is characterized in that a restart-time ignition time interval given between a timing when a cranking is started and a time point when a restart-time first ignition cylinder which is scheduled to firstly start the combustion is initially ignited is previously calculated, and a drive-start timing of starter motor is delayed from a timing when a condition of restart request of internal combustion engine is satisfied in accordance with this restart-time ignition time interval, when the automatic restart of internal combustion engine is carried out during the idling-stop control. Thereby, the cranking by the starter motor is carried out under a state where hydraulic pressure supplied from the electric oil pump has increased.

Advantageous Effects of the Invention

According to the present invention, the timing for initially igniting a gas in the restart-time first ignition cylinder is delayed until the line pressure of automatic transmission has risen to a certain extent, at the time of automatic restart of internal combustion engine. Therefore, a combustion stability in the internal combustion engine at the time of automatic restart can be secured, and also the slip of friction engagement element of the automatic transmission can be suppressed when the initial ignition is conducted in the restart-time first ignition cylinder.

BRIEF EXPLANATION OF DRAWINGS

FIG. 2 A schematic explanatory view showing the system configuration of the controller of internal combustion engine according to the present invention.

DESCRIPTION OF EMBODIMENTS

Figure 1:
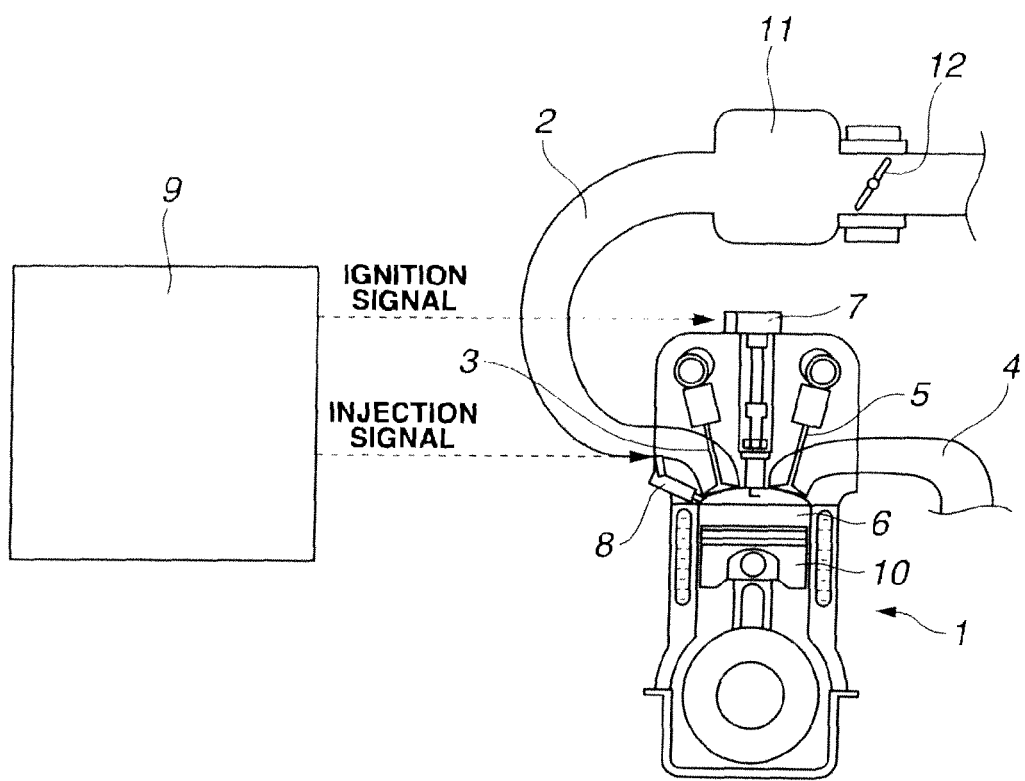
FIG. 1 A schematic explanatory view showing a system configuration of a controller of internal combustion engine according to the present invention.

Hereinafter, an embodiment according to the present invention will be explained in detail referring to the drawings. FIGS. 1 and 2 are explanatory views showing a schematic system configuration of a controller (control apparatus) of internal combustion engine according to the present invention.

This internal combustion engine 1 is a multi-cylinder spark-ignition internal combustion engine of direct-injection type. As shown in FIG. 1, each cylinder is provided with an intake valve 3 for opening/closing an intake passage 2, an exhaust valve 5 for opening/closing an exhaust passage 4, a spark plug 7 for spark-igniting a gas mixture existing within a combustion chamber 6, and a fuel injection valve 8 for injecting fuel directly into the combustion chamber 6. Operations of the spark plug 7 and the fuel injection valve 8 are controlled based on control commands derived from a C/U (control unit) 9. In FIG. 1, a reference sign 10 denotes a piston, a reference sign 11 denotes a collector connected with the intake passage 2 of each cylinder, and a reference sign 12 denotes a throttle valve.

Moreover, as shown in FIG. 2, driving force of the internal combustion engine 1 is transmitted through a torque converter 13 to a CVT (continuously variable transmission) 14 serving as an automatic transmission. The driving force transmitted to this CVT 14 is further transmitted through a differential gear 15 to a drive wheel(s) 16.

A disk-shaped drive plate 18 which rotates integrally with a crankshaft 17 of the internal combustion engine 1 is disposed between a main body of the internal combustion engine 1 and the torque converter 13. This drive plate 18 includes (is formed with) a ring gear 21 at an outer circumferential portion of the drive plate 18. A pinion gear 20 provided to a shaft of a starter motor 19 plunges (moves forward) to the ring gear 21 and thereby engages with the ring gear 21, at the time of start of the internal combustion engine 1.

The CVT 14 includes a primary pulley 22 functioning as an input-side pulley, a secondary pulley 23 functioning as an output-side pulley, and a clutch 24 functioning as a friction engagement element. A rotation of the primary pulley 22 is transmitted through a belt (not shown) to the secondary pulley 23. The clutch 24 is connected (engaged) when driving torque from the internal combustion engine 1 is inputted to the primary pulley 22. That is, the clutch 24 is engaged in a case that the driving torque derived from the internal combustion engine 1 becomes able to be transmitted to the drive wheel 16. The operations for engagement/disengagement of the clutch 24 are conducted based on control commands from the control unit 9.

Oil pressure (line pressure) is supplied from a mechanical oil pump 25 and an electric oil pump 27 to the CVT 14. The mechanical oil pump 25 is driven in synchronization with (to interlock with) a rotation of the crankshaft 17 of internal combustion engine 1. A power source of the electric oil pump 27 is a battery 26. A drive of the electric oil pump 27 is performed based on control commands derived from the control unit 9 (as will be described later in detail). That is, this control unit 9 corresponds to an electric-oil-pump control means according to the present invention.

The control unit 9 receives detection signals from various kinds of sensors such as a crank angle sensor 28 and a cam angle sensor 29 for detecting and calculating an engine rotational speed and a rotational angle (position) of crankshaft 17, an oil temperature sensor 30 for detecting a temperature of working oil of CVT 14, a hydraulic-pressure sensor 31 for detecting an oil pressure of CVT 14, a water-temperature sensor 32 for detecting a cooling-water temperature of internal combustion engine 1, an accelerator sensor 33 for detecting a depression of accelerator pedal, a vehicle speed sensor 34 for detecting a vehicle speed, a selected-position sensor 35 for detecting a selected position of shift lever, an open/closed-state sensor 36 for detecting an open/closed state of an opening-and-closing device (e.g., a door, a hood or bonnet of the vehicle), and a brake-pedal sensor 37 for detecting a depression of brake pedal. The control unit 9 can detect a stop position of the piston 10 of each cylinder and can determine a restart-time first ignition cylinder by using the signals derived from the crank angle sensor 28 and the cam angle sensor 29, when the internal combustion engine 1 is automatically stopped (idling stop). This restart-time first ignition cylinder is a cylinder which is ignited at the beginning when the internal combustion engine 1 is automatically restarted. That is, the control unit 9 corresponds to a piston-position detecting means according to the present invention.

The open/closed-state sensor 36 functions to detect open states or closed states of all the opening-and-closing devices of the vehicle such as the doors and the bonnet. Moreover, the control unit 9 is electrically connected with the battery 26 and can detect a voltage and a charge amount (status) of the battery 26.

The control unit 9 performs an idling-stop control. Namely as the idling-stop control, the control unit 9 automatically stops (suspends) the internal combustion engine 1 when the vehicle temporarily stops, e.g., when waiting at traffic lights; and automatically restarts the internal combustion engine 1 when the vehicle starts (moves forward) from the automatically stopped state of internal combustion engine 1. That is, this control unit 9 corresponds to an idling-stop control means according to the present invention.

Figure 3:
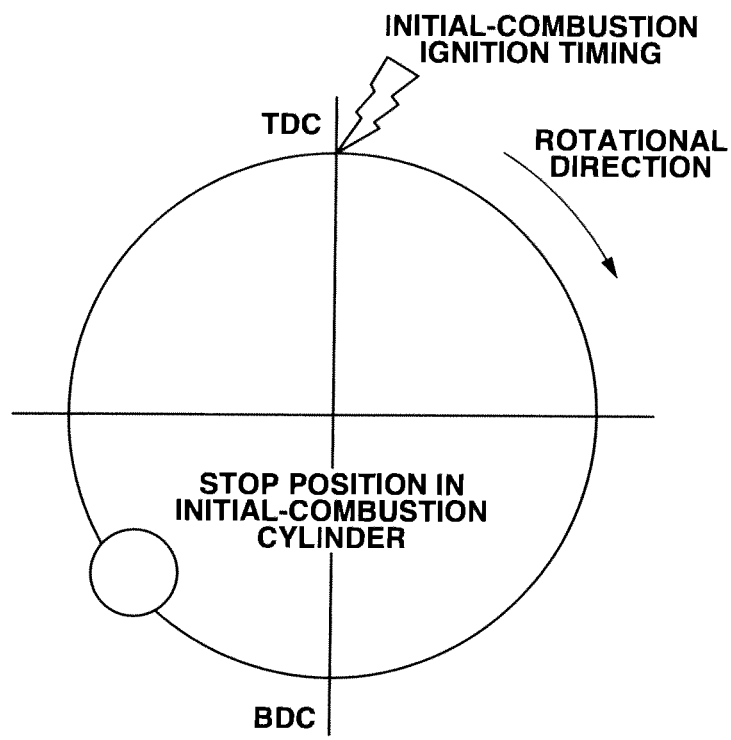
FIG. 3 A schematic explanatory view showing a case where a stop position of restart-time first ignition cylinder is in a compression stroke.

Moreover, in this embodiment, the control unit 9 calculates a restart-time ignition time interval during the idling-stop control. This restart-time ignition time interval is a time interval between a time point when a cranking activation of internal combustion engine 1 is started and a time point when the restart-time first ignition cylinder (i.e., a cylinder which firstly starts the combustion among all cylinders, hereinafter also referred to as "first-time combustion cylinder") is ignited initially (as a first-time ignition), in a case that the internal combustion engine 1 is cranked from the stop position of piston 10 in the restart-time first ignition cylinder under the automatically stopped state of internal combustion engine 1, at the time of automatic restart of internal combustion engine 1. The control unit 9 varies a drive-start timing of the starter motor 19 in accordance with this restart-time ignition time interval. That is, as shown in FIG. 3, the drive-start timing of starter motor 19 is varied according to a distance (crank angle difference) between the stop position of piston 10 of the restart-time first ignition cylinder and an ignition timing of the restart-time first ignition cylinder. FIG. 3 schematically shows a case where the stop position in the restart-time first ignition cylinder is in a compression stroke.

When the idling-stop control in this embodiment is carried out, the clutch 24 of CVT 14 is being engaged. Also, when the internal combustion engine 1 is in the automatically-stopped state during the idling-stop control, the drive of electric oil pump 27 is controlled to cause the CVT 14 to continue to receive a level of line pressure that is enough to prevent a slip of clutch 24 at the time of the cranking start-up of engine by the starter motor 19. When a restart request of the internal combustion engine 1 is outputted during the idling-stop control, the electric oil pump 27 is controlled to immediately bring a discharge amount of working oil of electric oil pump 27 (i.e., a discharge rate that is discharged from the electric oil pump 27) to a maximum discharge amount of electric oil pump 27.

Figure 4:
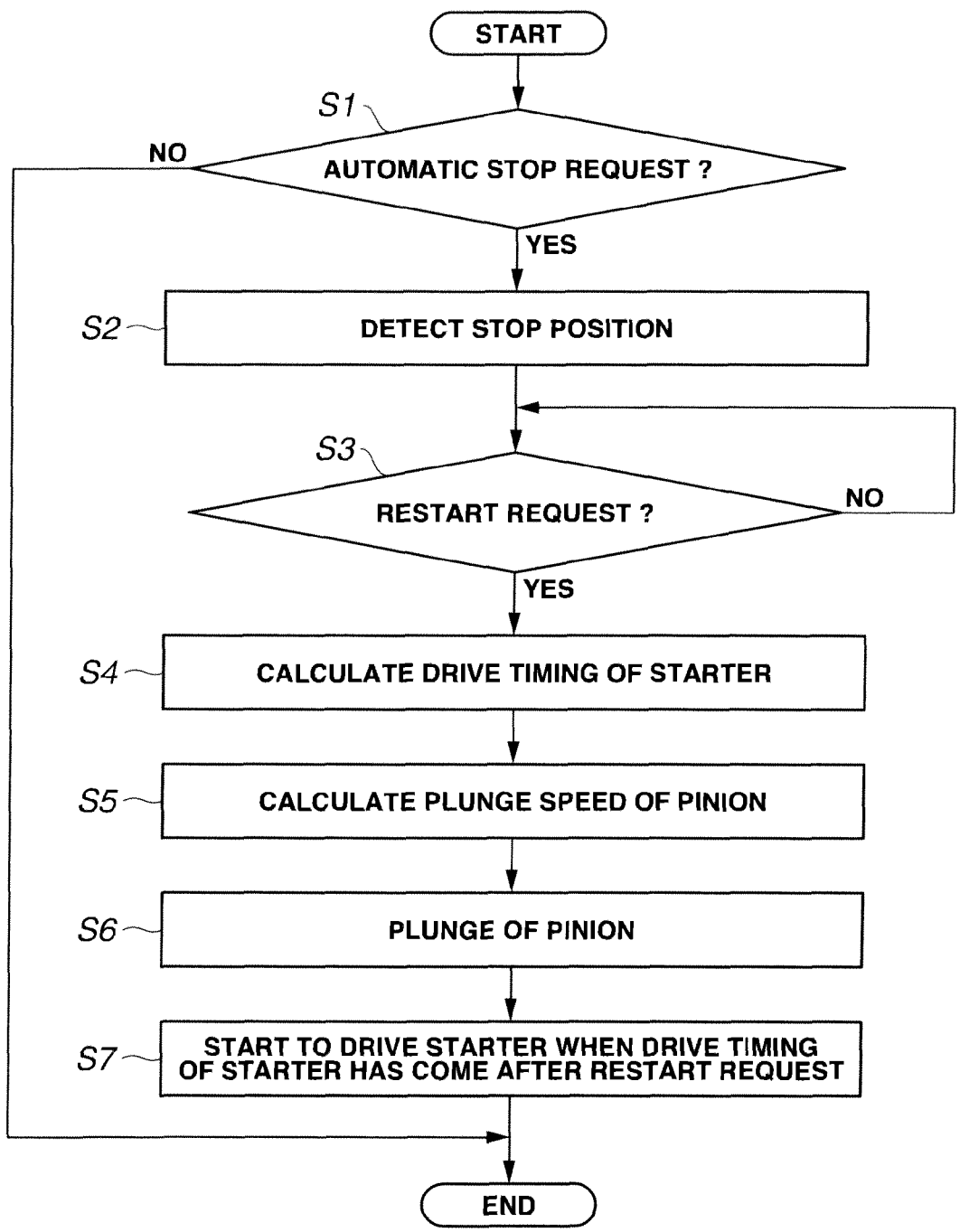
FIG. 4 A flowchart showing a control flow related to a drive of starter motor at the time of automatic restart of internal combustion engine in the controller of internal combustion engine according to the present invention.

FIG. 4 is a flowchart showing a control flow related to the drive of starter motor at the time of automatic restart of internal combustion engine 1 in this embodiment. The control shown in FIG. 4 is conducted by a microprocessor (not shown) included in the control unit 9. The control unit 9 includes memory devices such as RAM and ROM, other than arithmetic devices such as the microprocessor.

At step (hereinafter simply described as "S") 1, the control unit 9 judges whether a request of the automatic stop of internal combustion engine 1 is present or absent. If the automatic-stop request is present (outputted) at S1; the control unit 9 automatically stops (a rotation of) the internal combustion engine 1, and the program proceeds to S2. If NO at S1, a current routine is ended. For example, in a case that a condition where all the opening-and-closing devices such as doors and bonnet are in closed state, a condition where the internal combustion engine 1 is in operation, a condition where the vehicle speed is equal to 0 (zero), a condition where the shift selection lever is in a D-range, a condition where the brake pedal is in a depressed state, and the like are all satisfied; a condition for the automatic-stop request is satisfied so that it is determined that the automatic-stop request is present. When the internal combustion engine 1 is in the automatically-stopped state; the clutch 24 of CVT 14 is being engaged, and a level of line pressure at which the slip of clutch 24 is not caused at the time of cranking activation by the starter motor 19 is being supplied to the CVT 14 by driving the electric oil pump 27.

At S2, during the automatic stop of internal combustion engine 1, the control unit 9 detects the stop position of piston 10 in the restart-time first ignition cylinder that starts the combustion in the first place (first-time combustion cylinder) at the time of automatic restart of internal combustion engine 1.

At S3, the control unit 9 judges whether the restart request of internal combustion engine 1 is present or absent. For example, in a case that the brake pedal is released or the accelerator pedal is depressed during the automatic stop of internal combustion engine 1, a condition for the restart request is satisfied so that it is determined that the restart request is present.

Figure 5:
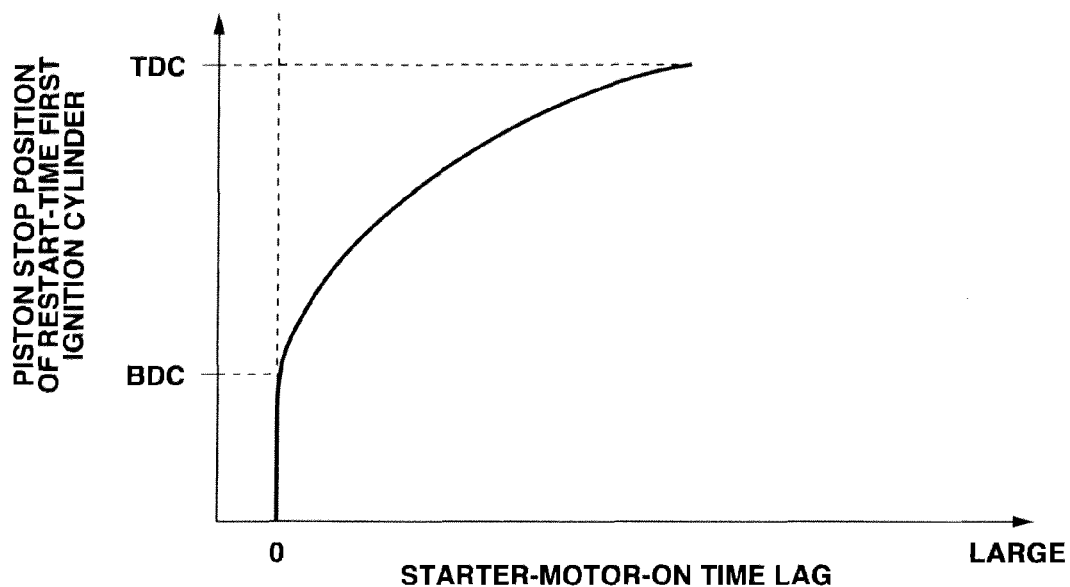
FIG. 5 A characteristic view showing a correlative relation between the piston stop position of the restart-time first ignition cylinder and a starter-motor-ON time lag.

At S4, the control unit 9 calculates the timing for driving the starter motor 19, which is used when the internal combustion engine 1 is automatically restarted by the starter motor 19. In detail, on the assumption that the internal combustion engine 1 is cranked up from the stop position of piston 10 in the restart-time first ignition cylinder under the automatically stopped state of internal combustion engine 1, the restart-time ignition time interval which is given between a start of cranking activation of engine and an initial ignition of the restart-time first ignition cylinder is calculated. According to this restart-time ignition time interval, the drive-start timing of starter motor 19 is calculated. This S4, namely, the control unit 9 corresponds to a restart-time ignition time-interval calculating means according to the present invention. As shown in FIG. 5, the drive timing for the starter motor 19 is set to increase a starter-motor-ON time lag as the above-mentioned restart-time ignition time interval becomes shorter (as the stop position of piston is located closer to a compression top dead center). This starter-motor-ON time lag is a time interval between a time point when it is determined that the restart request is present (i.e., a time point when the condition for restart request is satisfied) and a time point when the starter motor 19 starts to be driven. In other words, the starter-motor-ON time lag is set to cause the electric oil pump 27 to increase the line pressure of CVT 14 up to a pressure level that can prevent the clutch 24 from slipping when a combustion torque is inputted to the CVT 14.

Figure 6:
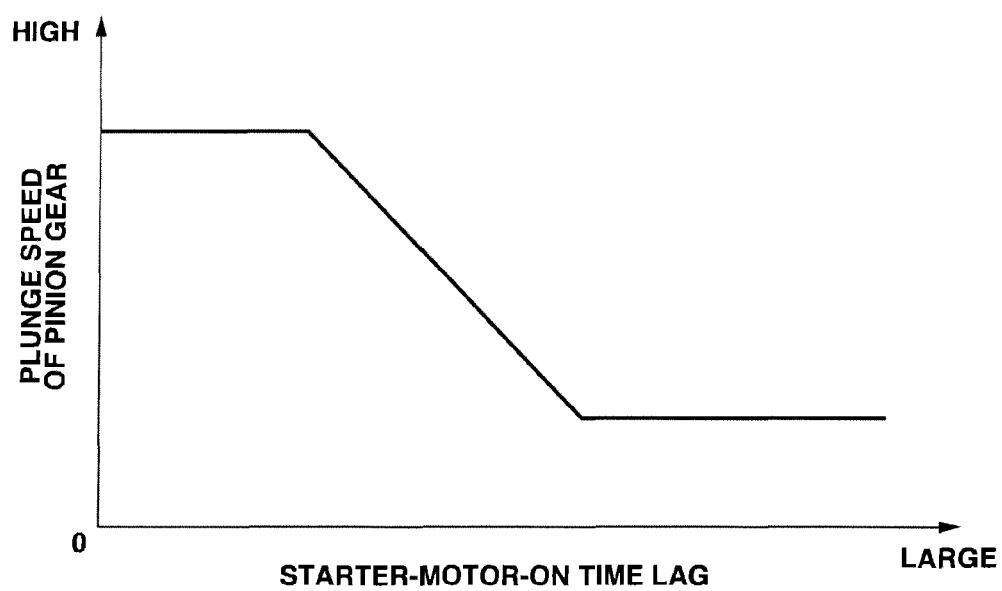
FIG. 6 A characteristic view showing a correlative relation between a plunging speed of pinion gear and the starter-motor-ON time lag.

At S5, the control unit 9 calculates a plunging speed of the pinion gear 20 of starter motor 19 relative to the ring gear 21 of drive plate 18 (i.e., a forward moving speed for being enmeshed with the ring gear 21), which is used when engaging (meshing) the pinion gear 20 with the ring gear 21. As shown in FIG. 6, the plunging speed of pinion gear 20 is set lower as the above-mentioned starter-ON time lag becomes greater (as the restart-time ignition time interval becomes smaller). This is for the following reason. In this embodiment, the timing for the cranking activation of internal combustion engine 1 by the starter motor 19 is more delayed because it is necessary to wait for the electric oil pump 27 to increase the line pressure of CVT 14 for a longer time as the restart-time ignition time interval becomes smaller. Thereby, the plunging speed of pinion gear 20 can be made slower as the restart-time ignition time interval becomes smaller. On the other hand, the timing for the cranking activation of internal combustion engine 1 by the starter motor 19 is relatively put more ahead as the starter-ON time lag becomes smaller (as the restart-time ignition time interval becomes longer). Hence, if the plunging speed of pinion gear 20 is made slow in the case that the starter-ON time lag is relatively small, there is a risk that the timing of cranking activation of internal combustion engine 1 by the starter motor 19 is delayed from its target. Therefore, in this embodiment, the plunging speed of pinion gear 20 is set to be lower as the restart-time ignition time interval becomes smaller.

At S6, the pinion gear 20 is plunged into the ring gear 21 at the plunging speed calculated at S5, and thereby, is engaged (enmeshed) with the ring gear 21.

Then, when a time length between a time point when the condition for restart request was satisfied and the drive-start timing of starter motor 19 calculated at S4 has elapsed, the starter motor 19 is driven to crank the internal combustion engine 1 at S7. That is, the drive of starter motor 19 is delayed from the time point when the condition for restart request was satisfied until the time point when the starter-ON time lag calculated at S4 has just elapsed.

Figure 7:
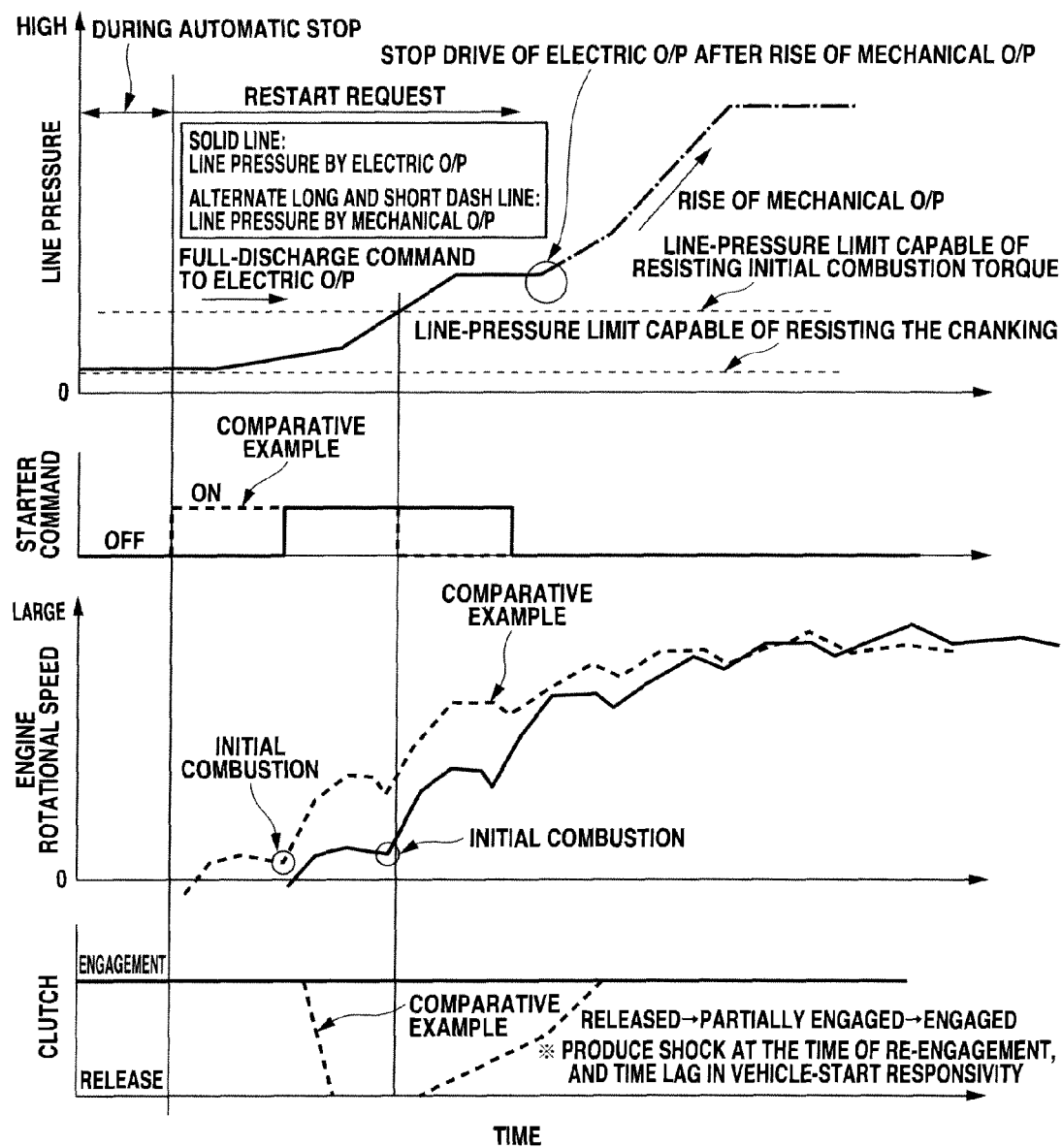
FIG. 7 A timing chart showing various state quantities at the time of automatic restart.

FIG. 7 is a timing chart showing various state quantities when the internal combustion engine 1 is automatically restarted.

During the automatic stop of internal combustion engine 1 (under the stopped state of internal combustion engine 1 by way of the automatic idling-stop), the electric oil pump 27 is being driven in order to maintain the engagement of clutch 24. However, in order to reduce a power consumption, during the automatic stop of internal combustion engine 1, the electric oil pump 27 is being driven so as to keep the line pressure to the minimum necessary to prevent the slip of clutch 24 when cranking the internal combustion engine 1 by the starter motor 19 during the automatic restart of internal combustion engine 1.

Then, when the condition for restart request is satisfied, the discharge amount of working oil to be discharged from the electric oil pump 27 is set to become its maximum level (an obtainable maximum discharge amount) of the electric oil pump 27. That is, when the condition for restart request is satisfied, the control unit 9 outputs a full-discharge command to the electric oil pump 27, as the control command.

As a comparative example shown by a dotted line of FIG. 7, in a case that the cranking activation of starter motor 19 is started (a starter command is set at "ON") right when the condition for restart request is satisfied, the clutch 24 cannot withstand the combustion torque and comes to slip when the combustion torque is inputted to the CVT 14. This is because the line pressure of CVT 14 has not yet risen up to a pressure level that can prevent the clutch 14 from slipping due to the combustion torque even though the full-discharge command has been outputted to the electric oil pump 27, when the combustion torque is inputted to the CVT 14. Due to this slip, the clutch 24 becomes temporarily in a released state, and then becomes in an engaged state through a partially-engaged state with the increase of line pressure. In this case, a shock is caused when the clutch 24 is re-engaged, and a time lag occurs in vehicle-start responsively.

Contrary to this, in this embodiment, as shown by a solid line of FIG. 7, the combustion is started at an optimum timing depending on the rising of line pressure produced by the electric oil pump 27, by delaying the drive timing of starter motor 19 from the time point when the condition of the restart request is satisfied. Accordingly, the clutch 24 is prevented from slipping when the combustion torque is inputted to the CVT 14. The drive(-start) timing of starter motor 19 needs to have a longer delay from the establishment timing of the condition for restart request (i.e., the starter-motor-ON time lag from the occurrence of restart request is set to be longer) as the restart-time ignition time interval given between the start of cranking activation and the initial ignition of the restart-time first ignition cylinder is shorter.

Then, in this embodiment, when the line pressure is increased by the mechanical oil pump 25 because of the increase of rotational speed of internal combustion engine 1 as shown by an alternate long and short dash line of FIG. 7, the drive of electric oil pump 27 is deactivated.

As explained above, in this embodiment, in a situation that the internal combustion engine 1 existing under the automatically-stopped state is automatically restarted; the cranking (activation) of internal combustion engine 1 by the starter motor 19 is not carried out just when the condition of restart request is satisfied. Instead, in this embodiment, the drive timing of starter motor 9 is delayed from the timing when the condition of restart request is satisfied. Thereby, the cranking of internal combustion engine 1 is carried out by the starter motor 19 when the oil pressure supplied from the electric oil pump 27 has sufficiently increased. Therefore, the slip of clutch 24 in the CVT 14 can be suppressed when gas mixture in the restart-time first ignition cylinder is initially ignited.

Moreover, in this embodiment, in the situation that the internal combustion engine 1 is automatically restarted, an output torque of the internal combustion engine 1 is not suppressed. Therefore, both of the combustion stability and the suppression of slip in the clutch 24 of CVT 14 can be attained at the time of automatic restart of internal combustion engine 1.

Moreover, when the condition of restart request is satisfied, the pinion gear 20 is preliminary plunged to the ring gear 21, prior to the cranking activation of internal combustion engine 1 by the starter motor 19. Therefore, a teeth beating noise (gear rattle) which is caused when the pinion gear 20 is plunged into the ring gear 21 is generated at a timing different from generation timings of a teeth beating noise, a meshing noise and the like which are caused when the starter motor 19 is driven (i.e., when the cranking is started). Therefore, the drive noises of starter motor 19 can be relatively reduced.

Moreover, in this embodiment, the plunging speed of pinion gear 20 is made slower as the restart-time ignition time interval becomes smaller. Therefore, the teeth beatings which are caused when the pinion gear 20 is plunged to the ring gear 21 can be reduced.

According to the above-mentioned embodiment, the starter-motor-ON time lag which is a time length between the timing when the condition of restart request is satisfied and the timing when the starter motor 19 is driven can be corrected according to the temperature of working oil supplied to the CVT 14, the voltage of battery 26 for driving the electric oil pump 27, the line pressure of CVT 14 under the automatically-stopped state of internal combustion engine 1, or the temperature of cooling water of internal combustion engine 1. In such a case, the drive-start timing of starter motor 19 is further optimized at the time of automatic restart of internal combustion engine 1.

As the temperature of working oil supplied to the CVT 14 becomes lower, a viscosity of this working oil becomes higher so that the line pressure of CVT 14 becomes relatively low. On the other hand, as the temperature of working oil supplied to the CVT 14 becomes higher; the viscosity of working oil becomes lower so that the line pressure of CVT 14 becomes relatively low. Accordingly, in a case that the temperature of working oil is excessively low or excessively high as compared with a temperature range (for example, 60° C.~90° C.) which is normally used, the starter-motor-ON time lag may be corrected to be elongated by that much.

Moreover, as the voltage of battery 26 becomes lower, a capability of the electric oil pump 27 becomes lower so that the line pressure of CVT 14 becomes lower. Accordingly, the starter-motor-ON time lag may be corrected to be more elongated as the voltage of battery 26 becomes lower.

If the line pressure of CVT 14 under the automatically-stopped state of internal combustion engine 1 can be directly detected, the starter-motor-ON time lag may be corrected to be more elongated as the detected line pressure is lower.

Moreover, as the temperature of cooling water of internal combustion engine 1 becomes higher, a friction of internal combustion engine 1 becomes lower so that the driving torque which is inputted from the internal combustion engine 1 to the clutch 14 of CVT 14 at the time of combustion becomes greater. Accordingly, the starter-motor-ON time lag may be corrected to be more elongated as the temperature of cooling water is higher.

In the above-mentioned embodiment, the CVT 14 is used as an automatic transmission. However, a step automatic transmission (multi-speed automatic transmission) can be used instead of the CVT 14. In this case, the above-mentioned clutch 24 is constructed by using a plurality of friction engagement elements included in the step automatic transmission.

Technical ideas according to the present invention which can be grasped from the above-mentioned embodiments will now be listed with their advantageous effects.

(1) A controller of internal combustion engine includes the idling-stop control means for performing the automatic stop and the automatic restart of internal combustion engine in accordance with an operating state of vehicle; the automatic transmission including a friction engagement element configured to transmit driving torque of the internal combustion engine and configured to be engaged to allow driving torque to be transmitted from the internal combustion engine to the drive wheel of vehicle when the automatic stop and the automatic restart of internal combustion engine are carried out; the starter motor configured to crank up the internal combustion engine when the condition of restart request of internal combustion engine is satisfied under the automatic stop of internal combustion engine; the mechanical oil pump configured to supply hydraulic pressure to the automatic transmission by being driven by the internal combustion engine; the electric oil pump configured to supply hydraulic pressure to the automatic transmission under the automatic stop of internal combustion engine; and the electric-oil-pump control means for controlling the electric oil pump to cause the electric oil pump to supply a first level of line pressure to the automatic transmission under the automatic stop of internal combustion engine. This first level of line pressure prevents the friction engagement element of automatic transmission from slipping when the starter motor cranks up the internal combustion engine. Moreover, the electric-oil-pump control means is configured to cause the discharge amount of working fluid of electric oil pump to become greater when the condition of restart request is satisfied, as compared with a level of the discharge amount of working fluid of electric oil pump under the automatic stop. The controller of internal combustion engine further includes the piston-position detecting means for detecting a stop position of piston in the restart-time first ignition cylinder under the automatic stop of internal combustion engine. This restart-time first ignition cylinder is a cylinder which is (scheduled to be) firstly ignited at the time of automatic restart of internal combustion engine. The controller of internal combustion engine further includes the restart-time ignition time-interval calculating means for calculating the restart-time ignition time interval which is given between a time point when the starter motor starts to crank up the internal combustion engine and a time point when the restart-time first ignition cylinder should be initially ignited, during the automatic stop of internal combustion engine, by using the detected stop position of piston inside the restart-time first ignition cylinder. The drive-start timing of starter motor is set to have a longer delay from the time point when the condition of restart request has just been satisfied, as the restart-time ignition time interval becomes shorter. Therefore, the cranking (activation) by the starter motor is performed after the hydraulic pressure supplied from the electric oil pump has become sufficiently high. That is, the timing at which gas within the restart-time first ignition cylinder is initially ignited for the automatic restart of internal combustion engine is delayed until the line pressure of automatic transmission has increased to some extent. Accordingly, the combustion stability of internal combustion engine is ensured at the time of automatic restart, and the slip of friction engagement element of automatic transmission can be suppressed when the initial ignition is conducted in the restart-time first ignition cylinder.

(2) The controller of internal combustion engine described in the item (1) further includes oil-temperature detecting means for detecting a temperature of working fluid supplied to the automatic transmission, and the drive-start timing of the starter motor is corrected according to the detected temperature of working fluid. That is, as the temperature of working fluid becomes lower, a viscosity of working fluid becomes higher so that the line pressure of automatic transmission becomes lower. On the other hand, as the temperature of working fluid becomes higher; the viscosity of working fluid becomes lower so that the line pressure of automatic transmission becomes lower. Therefore, in the structure according to the present invention, the drive-start timing of starter motor can be optimized at the time of automatic restart of internal combustion engine.

(3) The controller of internal combustion engine described in the item (1) or (2) further includes battery-voltage detecting means for detecting a voltage of the battery configured to drive the electric oil pump, and the drive-start timing of the starter motor is more delayed as the detected voltage of the battery becomes lower. That is, as the voltage of battery becomes lower, the capability of electric oil pump becomes lower. Hence, the drive-start timing of starter motor is more delayed as the battery voltage is lower. Therefore, the drive-start timing of starter motor can be optimized at the time of automatic restart of internal combustion engine.

(4) The controller of internal combustion engine described in one of the items (1) to (3) further includes line-pressure detecting means for detecting the line pressure of automatic transmission, and the drive-start timing of the starter motor is more delayed as the line pressure of automatic transmission detected under the automatic stop becomes lower. Therefore, the drive-start timing of starter motor at the time of automatic restart of internal combustion engine can be optimized.

(5) The controller of internal combustion engine described in one of the items (1) to (4) further includes cooling-water temperature detecting means for detecting a temperature of cooling water of the internal combustion engine, and the drive-start timing of the starter motor is more delayed as the detected temperature of cooling water becomes higher. That is, as the temperature of cooling water becomes higher, the friction of internal combustion engine becomes lower so that the driving torque which is inputted from the internal combustion engine to the automatic transmission at the time of combustion becomes greater. Accordingly, the drive-start timing of starter motor is more delayed as the temperature of cooling water is higher. Therefore, the drive-start timing of starter motor can be optimized at the time of automatic restart of internal combustion engine.

(6) In the controller of internal combustion engine described in one of the items (1) to (5), the starter motor is configured to crank up the internal combustion engine under a state where the pinion gear is meshing with the ring gear provided to the internal combustion engine, and the starter motor is configured to preliminary mesh the pinion gear with the ring gear by plunging the pinion gear toward the ring gear when the restart request is satisfied. Therefore, the teeth beating noise which is caused when the pinion gear is plunged into the ring gear is generated at a timing different from generation timings of a teeth beating noise, a meshing noise and the like which are caused when driving the starter motor (i.e., when starting the cranking). Therefore, the drive noise of starter motor can be relatively reduced.

(7) In the controller of internal combustion engine described in the item (6), the speed at which the pinion gear is plunged toward the ring gear is made slower as the restart-time ignition time interval becomes shorter. That is, the timing of drive start of the starter motor is more delayed because it is necessary to wait for the electric oil pump to increase the line pressure of automatic transmission for a longer time as the restart-time ignition time interval becomes smaller. Therefore, in this structure according to the present invention, the teeth beatings can be reduced when the pinion gear is plunged to the ring gear.

LIST OF REFERENCE NUMERALS

1 - - - Internal combustion engine
9 - - - C/U (control unit)
13 - - - Torque converter
14 - - - CVT
15 - - - Differential gear
16 - - - Drive wheel
17 - - - Crankshaft
18 - - - Drive plate
19 - - - Starter motor
20 - - - Pinion gear
21 - - - Ring gear
22 - - - Primary pulley
23 - - - Secondary pulley
24 - - - Clutch
25 - - - Mechanical oil pump
26 - - - Battery
27 - - - Electric oil pump

What is claimed is:

1. A controller of an internal combustion engine, comprising:
   an idling-stop control section configured to perform an automatic stop and an automatic restart of the internal combustion engine in accordance with an operating state of a vehicle;
   an automatic transmission including a friction engagement element configured to be engaged when driving torque is transmitted from the internal combustion engine to a drive wheel of the vehicle;
   a starter motor configured to crank up the internal combustion engine when a condition of restart request of the internal combustion engine is satisfied under the automatic stop of the internal combustion engine;
   an electric oil pump configured to supply hydraulic pressure to the automatic transmission under the automatic stop of the internal combustion engine;
   an electric-oil-pump control section configured to control the electric oil pump:
   to cause the electric oil pump to supply a level of line pressure to the automatic transmission under the automatic stop of the internal combustion engine, wherein the level of the line pressure prevents the friction engagement element of the automatic transmission from slipping when the starter motor cranks up the internal combustion engine, and to cause a discharge amount of working fluid of the electric oil pump to become greater when the condition of restart request is satisfied, as compared with a level of the discharge amount of the working fluid of the electric oil pump under the automatic stop; and a restart-time ignition time-interval calculating section configured to calculate a restart-time ignition time interval given between a time point when the starter motor starts to crank up the internal combustion engine after the condition of restart request has been satisfied and a time point when a restart-time first ignition cylinder is initially ignited, wherein the restart-time first ignition cylinder is a cylinder which is firstly ignited at time of the automatic restart of the internal combustion engine, and wherein a drive-start timing of the starter motor is set to have a longer delay from a time point when the condition of restart request is satisfied, as the restart-time ignition time interval becomes shorter.

2. The controller as claimed in claim 1, wherein the controller further comprises a piston-position detecting section configured to detect a stop position of a piston in the restart-time first ignition cylinder under the automatic stop of the internal combustion engine, and wherein the restart-time ignition time-interval calculating section is configured to calculate the restart-time ignition time interval by using the detected stop position of the piston in the restart-time first ignition cylinder.

3. The controller as claimed in claim 1, wherein the controller further comprises an oil-temperature detecting section configured to detect a temperature of the working fluid supplied to the automatic transmission, and wherein the drive-start timing of the starter motor is corrected according to the detected temperature of the working fluid.

4. The controller as claimed in claim 1, wherein the controller further comprises a battery-voltage detecting section configured to detect a voltage of a battery configured to drive the electric oil pump, and wherein the drive-start timing of the starter motor is more delayed as the detected voltage of the battery becomes lower.

5. The controller as claimed in claim 1, wherein the controller further comprises a line-pressure detecting section configured to detect the line pressure of the automatic transmission, and wherein the drive-start timing of the starter motor is more delayed as the line pressure of the automatic transmission detected under the automatic stop becomes lower.

6. The controller as claimed in claim 1, wherein the controller further comprises a cooling-water temperature detecting section configured to detect a temperature of cooling water of the internal combustion engine, and wherein the drive-start timing of the starter motor is more delayed as the detected temperature of the cooling water becomes higher.

7. The controller as claimed in claim 1, wherein the starter motor is configured to crank up the internal combustion engine under a state where a pinion gear is meshing with a ring gear provided to the internal combustion engine, and wherein the starter motor is configured to preliminarily mesh the pinion gear with the ring gear by plunging the pinion gear toward the ring gear when the condition of restart request is satisfied.

8. The controller as claimed in claim 7, wherein a speed at which the pinion gear is plunged toward the ring gear is made slower as the restart-time ignition time interval becomes shorter.

\* \* \* \* \*